US008244409B2

(12) United States Patent
Bergsten

(10) Patent No.: US 8,244,409 B2
(45) Date of Patent: Aug. 14, 2012

(54) METHOD FOR CONTROLLING A BRAKING FORCE OF A VEHICLE

(75) Inventor: Jörgen Bergsten, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 981 days.

(21) Appl. No.: 12/097,919

(22) PCT Filed: Jan. 2, 2006

(86) PCT No.: PCT/SE2006/000007
§ 371 (c)(1),
(2), (4) Date: Jun. 18, 2008

(87) PCT Pub. No.: WO2007/078222
PCT Pub. Date: Jul. 12, 2007

(65) Prior Publication Data
US 2008/0262682 A1 Oct. 23, 2008

(51) Int. Cl.
*G05D 1/00* (2006.01)
*G05D 3/00* (2006.01)
*G06F 7/00* (2006.01)
*G06F 7/70* (2006.01)
*G06F 17/00* (2006.01)

(52) U.S. Cl. .............................................. 701/1; 701/50

(58) Field of Classification Search .................. 701/50, 701/1, 124; 340/679, 680, 684, 685, 686.1, 340/689, 440; 172/2, 4, 4.5, 12, 450; 37/413, 37/902, 904, 907; 414/694, 698–700; 280/427, 280/428, 432, 446.1, 455.1, DIG. 14; 73/488; 188/195, 349, 345

See application file for complete search history.

(56) References Cited

U.S. PATENT DOCUMENTS

| 4,560,210 A | 12/1985 | Tani et al. |
| 5,361,211 A | 11/1994 | Lee et al. |
| 2002/0075157 A1 | 6/2002 | Muller |

FOREIGN PATENT DOCUMENTS

| DE | 10133859 A1 | 1/2003 |
| EP | 0433858 A2 | 6/1991 |
| JP | 10025098 A | 1/1998 |
| JP | 2002096999 A | 8/2002 |

OTHER PUBLICATIONS

International Search Report from corresponding International Application No. PCT/SE2006/000007.
International Preliminary Report on Patentability from corresponding International Application No. PCT/SE2006/000007.

*Primary Examiner* — Christopher J. Novosad
(74) *Attorney, Agent, or Firm* — WRB-IP LLP

(57) ABSTRACT

A method and a system are provided for controlling a braking force of a vehicle. The method includes the steps of detecting at least one operating parameter of the vehicle, detecting a position of an operator controlled braking element, determining a magnitude of a braking force on the basis of a detected magnitude of the operating parameter and the detected position of the operator controlled braking element and braking the vehicle according to the determined braking force.

19 Claims, 3 Drawing Sheets

METHOD FOR CONTROLLING A BRAKING FORCE OF A VEHICLE

BACKGROUND AND SUMMARY

The present invention relates to a method for controlling a braking force of a vehicle. The invention further relates to a method for preventing tip-over of a work vehicle during traveling. The present invention also relates to a vehicle braking system and a work vehicle comprising the braking system.

The term "work vehicle" comprises different types of material handling vehicles like construction machines, such as a wheel loader, an articulated hauler, a backhoe loader, a motor grader and an excavator. Further terms frequently used for work vehicles are "earth-moving machinery" and "off-road work machines". The invention will be described below in a case in which it is applied in a wheel loader. This is to be regarded only as an example of a preferred application.

The work vehicles are for example utilized for construction and excavation work. A wheel loader may be used to transport heavy loads from one location to another, often encountering a series of turns and varying grade slopes on the route between two or more locations. If the load arm unit is in a raised position during traveling and the vehicle has a high speed, a hard braking action may cause an unstable condition, sometimes causing the rear wheels of the wheel loader to lift from the ground and providing discomfort to the operator. In extreme conditions, the wheel loader can tip over in the traveling direction.

Further, there are requirements on a minimum available retardation speed for a fully loaded vehicle when traveling on a road. The requirements on a minimum available retardation speed gives rise to very powerful vehicle braking systems. However, such powerful vehicle braking systems may increase the above mentioned problems when traveling with the load arm unit in a raised position.

Further, today many work vehicles are used by unexperienced operators. The above mentioned problems when traveling with the load arm unit in a raised position are further increased for unexperienced operators.

Accordingly, a method and a system is desired which operates reliably, protects the load, machine, and operator from a tip-over, provides operator comfort and acceptability, encourages operator confidence which may lead to more rapid maneuvering and greater productivity, and may be used in a timely and efficient manner.

U.S. Pat. No. 6,437,701 discloses a machine stabilization system for an articulated work machine. A plurality of operating parameters comprising the weight of the load and the implement position are detected and a stability value is determined based on the detected operating parameters. The stability value is compared to an alarm value. Should an instability condition be detected, an output signal is sent to an output device to alert the operator and/or affect the movement of the machine to prevent instability of the work machine. The output device may be a steering system or a braking system.

It is desirable to achieve a method for controlling a braking force of a vehicle in motion, which improves reliability and safety.

According to an aspect of the present invention, a method is provided for controlling a braking force of a vehicle, comprising the steps of detecting at least one operating parameter of the vehicle, detecting a position of an operator controlled braking element, determining a magnitude of a braking force on the basis of a detected magnitude of the operating parameter and the detected position of the operator controlled braking element and braking the vehicle according to the determined braking force. The braking method is preferably performed via a so-called brake-by-wire system.

According to a preferred embodiment the operating parameter comprises a force subjected to the vehicle. Such a force may for example arise from a vehicle load, such as a load (material) carried by an implement of a wheel loader, or a load (material) on a rear load carrier of an articulated hauler or a truck. In addition to the force from such vehicle loads, there is a force from the weight of the vehicle itself. Preferably, the total force subjected to a rear axle of the vehicle is determined/detected. The total force is preferably detected by means of a bearing sensor in the rear axle.

According to an alternative or complement to determining a force on the vehicle rear axle, a detected magnitude of a vehicle speed and/or a detected magnitude of a vertical position of an implement of the work vehicle may be used for controlling the braking force. Further, a detected value of a load of an implement of the work vehicle may be used for controlling the braking force.

According to a further preferred embodiment, the method comprises the step of selecting a braking force response from a stored set of responses on the basis of the detected magnitude of the operating parameter. Each stored response may comprise an individual function/algorithm and/or a look-up table.

According to a further preferred embodiment, the different stored braking force responses comprise different magnitudes of the braking force in response to a specific position of an operator controlled braking element. Preferably each individual position (or an interval of positions) in the whole range of positions of the operator controlled braking element corresponds to different magnitudes of the braking force.

According to a further preferred embodiment, the method comprises the step of calculating the braking force as a function of the detected magnitude of the operating parameter. Preferably, the braking force value has an inverted relation with regard to the detected magnitude of the operating parameter.

It is also desirable to achieve a method for preventing tip-over of a work vehicle with an implement for carrying a load, during traveling, which improves reliability and safety.

According to an aspect of the present invention, a method comprises the steps of detecting at least one operating parameter of the vehicle, detecting a position of an operator controlled braking element, determining a stability value based on the detected operating parameter and modifying a brake signal from the operator controlled braking element to a slower and/or decreased response if the stability value is above a predetermined alarm value. Thus, the alarm value defines a risk zone for vehicle tip-over.

Thus, the operator is not allowed to order a braking action which will cause tip-over of the machine. Thus, the braking force is reduced for work states, which are predefined based on the determined operating parameter (s).

Preferably, the stability value is calculated as a function of the operating parameter(s). The alarm value is preferably predetermined so that it will be reached when at least one of the operating parameters is above a predetermined value. Thus, the braking force is optimized for a certain work condition.

According to a preferred embodiment, the maximum braking force is unlimited when a maximum brake force is required from a vehicle operator. Thus, as a security measure, full braking capacity should be available if necessary. In other words, availability of the full braking capacity of the vehicle braking system takes priority/precedence over the tip-over braking force limitation.

Further preferred embodiments and advantages will be apparent from the following description and drawings.

BRIEF DESCRIPTION OF THE DRAWINGS

The invention will be explained below, with reference to the embodiments shown on the appended drawings, wherein FIG. 1 schematically shows a wheel loader in a side view.

DETAILED DESCRIPTION

Figure 1:
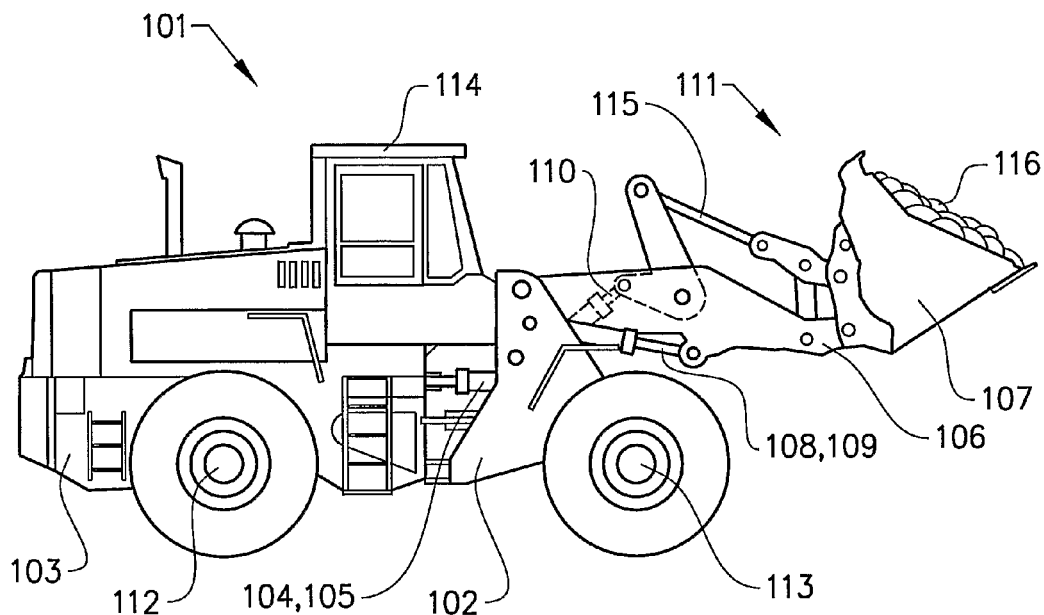

FIG. 1 shows a wheel loader 101. The body of the wheel loader 101 comprises a front body section 102 with a front frame, and a rear body section 103 with a rear frame, which sections each has a pair of half shafts 112,113. The rear body section 103 comprises a cab 114. The body sections 102,103 are connected to each other via an articulation joint in such a way that they can pivot in relation to each other around a vertical axis. The pivoting motion is achieved by means of two first actuators in the form of hydraulic cylinders 104,105 arranged between the two sections. Thus, the wheel loader is an articulated work vehicle. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106 and an implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

In operation of the wheel loader, the operator picks up a load 116 with the implement 107 and begins to travel to another location.

Figure 2:
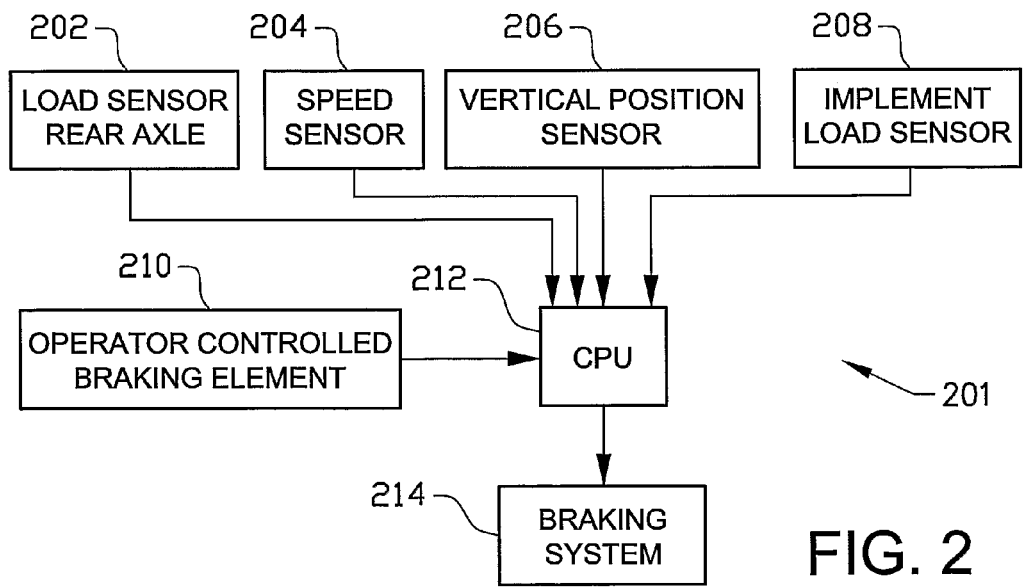
FIG. 2 is a block diagram of a machine control system of a preferred embodiment of the present invention.

A preferred embodiment of a vehicle control system 201 is disclosed in a block diagram in FIG. 2. The control system 201 comprises means 202,204,206,208 for detecting at least one operating parameter of the vehicle and responsively producing a signal. More precisely, the control system 201 comprises a rear axle load sensor 202, a vehicle speed sensor 204, a sensor 206 for detecting a vertical position of the implement 107 and a sensor 208 for detecting a weight of the load 116. The control system also comprises means 210 for detecting a position of an operator controlled braking element actuable by the operator, for example a footbrake pedal, and generating a corresponding signal.

The control system 201 further comprises means 212 for determining a magnitude of a braking force on the basis of a detected magnitude of one or several of the operating parameter and the detected position of the operator controlled braking element. According to one embodiment, said means 212 is adapted to manipulate a brake signal from the operator controlled braking element on the basis of a detected value of one or several of the operating parameters.

Said braking force determining means 212 is formed by a controller 212 adapted to receive signals from the rear axle load sensor 202, the speed sensor 204, the vertical position sensor 206 and the weight sensor 208. The control system 201 further comprises means 214 for controlling the braking force according to an output signal from the controller 212. Thus, the controller 212 is adapted to send an output signal to the braking control means 214. More precisely, the braking control means 214 is formed by a vehicle braking system.

The rear axle load sensor 202 preferably comprises a bearing sensor in a rear vehicle axle. One skilled in the art will appreciate that any other sensor capable of ascertaining a load on the rear axle may be utilized. For example, a value of the load may be achieved by measuring movement or deflection of a spring relative to the vehicle frame.

The vehicle speed sensor 204 can consist of or comprise a magnetic pick-up device that detects the movement of a gear tooth in a vehicle gearbox, as the speed of rotation of the gear tooth corresponds to the speed of a vehicle engine.

The sensor 206 which detects a vertical position of the implement 107 may be arranged to detect an articulation angle of the load arm unit 106. Alternatively, the sensor 206 may be arranged to detect the linear extent position of the lift cylinders 108,109.

The weight sensor 208 may be arranged for sensing a pressure in a hydraulic system providing the hydraulic cylinders 108, 109 with pressurized hydraulic liquid. According to one example, the weight sensor 208 is adapted to sense hydraulic pressure in at least one of the cylinders 108,109.

The controller 212 is commonly known as a central processing unit (CPU) or an electronic control module (ECM). In a preferred embodiment, the controller is a microprocessor.

The braking system 214 may be formed by any suitable known braking system, for example comprising one brake device at each wheel. For example, the brake device may comprise a hydraulically activated friction brake comprising two sets of brake discs, the discs of a first set of rotation discs located between the discs of a second set of stationary discs. As an alternative, the brake device may be represented by a brake calliper and a brake disc. It shall be realized that other kinds of brake devices are included, such as drum brakes, shaft brakes, etc.

Figure 3:
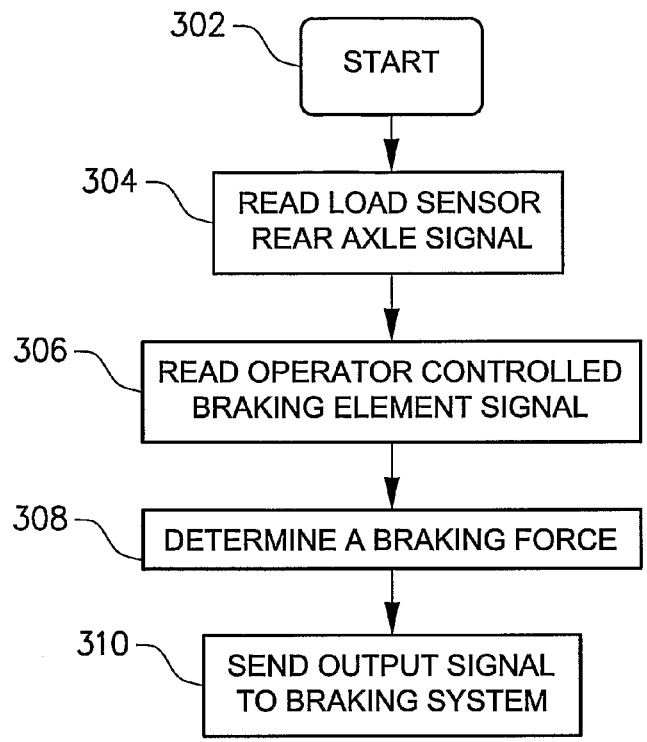
FIG. 3 is a flow chart diagram of a first preferred embodiment of the present invention.

FIG. 3 illustrates one embodiment of a flowchart of the method of the present invention. The logic starts at the start block 302. The controller 212 then proceeds to the read block 304 in which it reads the rear axle load sensor signal. Next, the controller 212 proceeds to the read block 306 in which it reads the operator controlled braking element signal. Next, the controller 212 proceeds to the block 308, in which it determines a magnitude of a braking force on the basis of the operator controlled braking element position and the detected magnitude of the rear axle load. One embodiment of a process for determining the resulting braking force is described below with reference to FIG. 4. A responsive output signal is sent to the braking system in block 310 and the braking force is controlled accordingly. In other words, the braking signal from the operator controlled element (brake pedal) is modified/manipulated in the controller 212.

Figure 4:
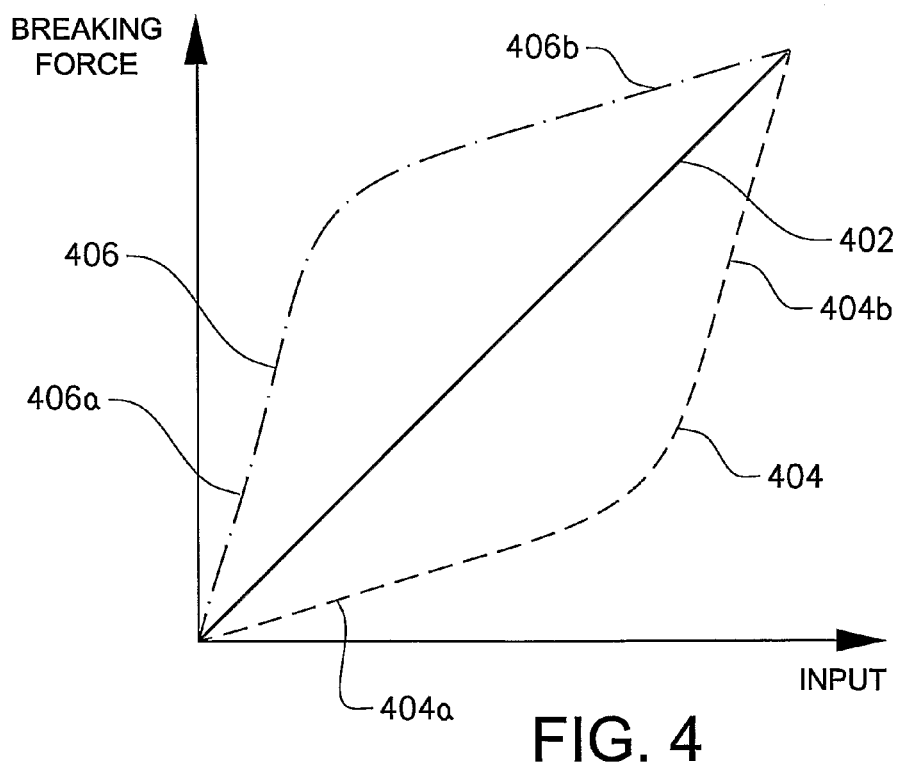
FIG. 4 is a graph used for determining a braking force according to the embodiment shown in FIG. 3

FIG. 4 illustrates one embodiment of a graph with three lines, or curves 402,404,406 representing three different responses to actuation of the operator controlled braking element.

A first, straight and inclined curve 402 illustrates a first mode, in which two different depression positions of the brake pedal (input) results in a braking force which is directly proportional to the extent of depression along the whole range of positions of the brake pedal. Thus, the signal from the brake pedal is not altered with in the first mode. Each of the second and third curves 404,406 has such an extension that two different depression positions of the brake pedal (input) results in a braking force which is non-proportional to the extent of depression of the brake pedal.

A second curve 404 extends along a curved line below the first straight line 402 and ends at the same point, which equals a fully depressed brake pedal. The second curve 404 represents a second mode, in which there is an exponential relationship between a depression of the brake pedal (input) and a resulting braking force. Thus, a specific position of the brake pedal results in a lower output response when the second mode is selected (relative to the first mode). A first portion 404a of the curve has a smaller degree of inclination with regard to an x-axis relative to the first curve 402 and a second portion 404b of the curve has a larger degree of inclination with regard to the x-axis relative to the first curve 402.

A third curve 406 extends along a curved line above the first straight line 402 and ends at the same point, which equals a fully depressed brake pedal. The third curve 406 represents a third mode, in which there is a logaritmic relationship between a depression of the brake pedal (input) and a resulting braking force. Thus, a specific position of the brake pedal results in a larger output response when the second mode is selected (relative to the first mode). A first portion 406a of the curve has a larger degree of inclination with regard to an x-axis relative to the first curve 402 and a second portion 406b of the curve has a smaller degree of inclination with regard to the x-axis relative to the first curve 402.

According to a first example, the control method is performed for the wheel loader 101, see FIG. 1. When the rear axle load sensor signal has a value that corresponds to that there is no risk or a low risk for tip-over forwards, the first curve 402 from FIG. 4 is selected. A certain depression of the brake pedal results in a braking force which is directly proportional to the extent of depression. However, when the rear axle load sensor signal has a value that corresponds to that there is a risk for tip-over forwards, the second curve 404 from FIG. 4 is selected. A certain depression of the brake pedal results in a braking force which is less than it would have been according to the first curve 402. In this way, a less braking response is achieved and the risk for any abrupt retardation of the wheel loader is reduced. The risk for tip-over is therefore also reduced.

According to a second example, the control method is performed for an articulated hauler. When the rear axle load sensor signal has a value that corresponds to that an application of the brakes should take place in a conventional way, the first curve 402 from FIG. 4 is selected. A certain depression of the brake pedal results in a braking force which is directly proportional to the extent of depression. However, when the rear axle load sensor signal has a value that corresponds to that there is a risk for a slower retardation than desired upon activation of the brake pedal, the third curve 406 from FIG. 4 is selected. This may be the case when the vehicle is driven in a downwards slope with a relatively high load on its rear platform. A certain depression of the brake pedal results in a braking force which is larger than it would have been according to the first curve 402. In this way, a larger braking response is achieved and the risk for an uncontrolled forwarding of the vehicle is reduced.

Figure 5:
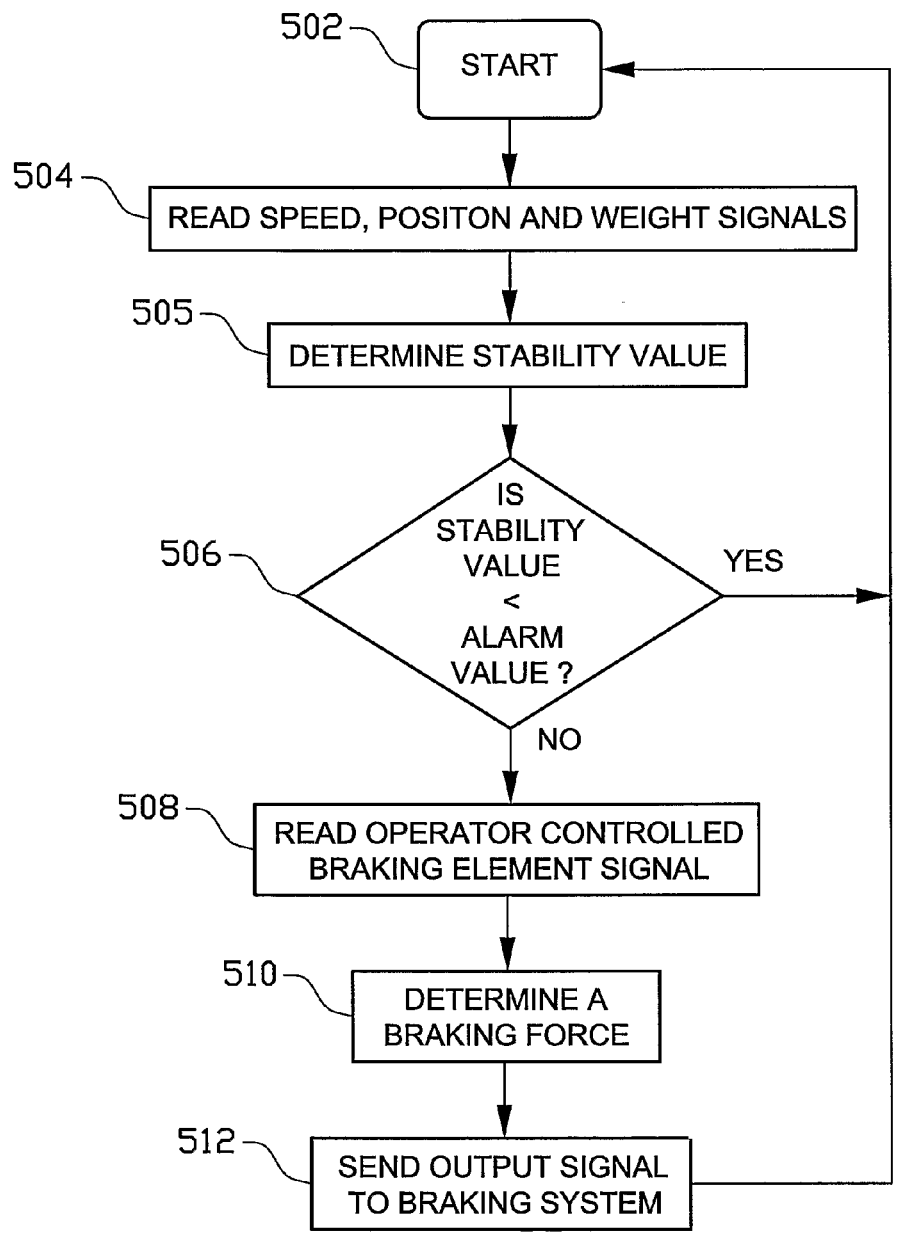
FIG. 5 is a flow chart diagram of a second preferred embodiment of the present invention.

FIG. 5 illustrates a further embodiment of a flowchart of the method for controlling the wheel loader 101. The logic starts at the start block 502. The controller 212 then proceeds to the read block 504 in which it reads the speed signal, the position signal and the weight signal. Next, the controller 212 determines a stability value based on the detected speed, vertical position and weight at the stability determination block 505. Next, the controller 212 compares the stability value with a predetermined alarm value in block 506.

If the stability value is less than the alarm value, or within a range of such alarm values, the controller 212 returns to the start block 502. If the stability value is greater than or equal to the alarm value, or outside a range of such alarm values, the controller 212 proceeds to the read block 508 in which it reads the operator controlled braking element signal. Next, the controller 212 proceeds to the block 510, in which it determines a magnitude of a braking force on the basis of the operator controlled braking element sensor and the stability value.

One embodiment of a process for determining the resulting braking force for a wheel loader is described above with reference to FIG. 4. A responsive output signal is sent to the braking system in block 512 and the braking force is controlled accordingly. In other words, the braking signal from the operator controlled element (brake pedal) is modified/manipulated in the controller 212.

Preferably, the controller 212 calculates the stability value as a function of the detected speed, vertical position and weight. Preferably, the detected speed, vertical position and weight are combined into a stability value. The stability value may be set as a relation between the detected speed, vertical position and weight and may be determined or calculated from a table, a formula, an algorithm, or any combination thereof.

The predetermined value used by the controller 212 may be taken from a table, a formula, an algorithm, or any combination thereof.

The method of FIG. 5 is performed frequently enough to provide the desired resolution and time responsiveness for determining an instability event, and controlling the braking system 214 to prevent a tip-over. Thus, if the controller 212 detects that the vehicle is approaching an operating condition in which a tip-over can occur, the braking system of the machine is controlled, to set the vehicle in a more stable vehicle operating condition.

The invention is of course not limited to the embodiments described above. Specifically, any one of or any combination of rear axle load value, speed value, position value and weight value may be used as input to the controller for manipulating the operator controlled braking element value.

One skilled in the art will appreciate that a load exerted on the vehicle may be ascertained in other ways than detecting a load on the rear axle. For example, a value of the load may be achieved by measuring movement or deflection of a spring relative to the vehicle frame.

The invention is of course applicable for carrying loads with other types of implements, like forks or grip arms for log handling.

The invention claimed is:

1. A method for controlling a braking force of a work vehicle, comprising the steps of
    detecting at least one operating parameter of the vehicle, wherein the at least one operating parameter comprises a vehicle speed,
    detecting a position of an operator controlled braking element, determining a magnitude of a braking force on the basis of a detected magnitude of the at least one operating parameter and the detected position of the operator controlled braking element, and braking the vehicle according to the determined braking force.

2. A method according to claim 1, wherein the at least one operating parameter comprises a force subjected to the vehicle.

3. A method according to claim 1, wherein the at least one operating parameter comprises a force subjected to a rear axle of the vehicle.

4. A method according to claim 3, wherein the force is detected by means of a bearing sensor in the rear axle.

5. A method according to claim 1, wherein the vehicle is a work vehicle and the at least one operating parameter comprises a vertical position of an implement of the work vehicle.

6. A method according to claim 1, wherein the vehicle is a work vehicle and the at least one operating parameter comprises a load of an implement of the work vehicle.

7. A method according to claim 1, comprising the step of selecting a braking force response from a stored set of responses on the basis of the detected magnitude of the at least one operating parameter.

8. A method according to claim 7, wherein the different stored braking force responses comprise different magnitudes of the braking force in response to a specific position of the operator controlled braking element.

9. A method according to claim 1, comprising the step of calculating the braking force as a function of the detected magnitude of the at least one operating parameter.

10. A method according to claim 1, the magnitude of the braking force has an inverted relation with regard to the detected magnitude of the at least one operating parameter.

11. A method according to claim 1, comprising the step of providing a maximum available braking force in a non-manipulated manner when a maximum braking force is required from a vehicle operator.

12. A computer programmed with a program comprising software code for carrying out all the steps as claimed in claim 1.

13. A computer program product comprising software code stored on a non-transitory medium that can be read by a computer for carrying out all the steps as claimed in claim 1.

14. A vehicle control system for a work vehicle, comprising means for detecting at least one operating parameter of the vehicle comprising vehicle speed, means for detecting a position of an operator controlled braking element, means for determining a magnitude of a braking force on the basis of a detected magnitude of the at least one operating parameter and the detected position of the operator controlled braking element, and means for braking the vehicle according to the determined braking force.

15. A vehicle control system according to claim 14, comprising means for detecting a force subjected to a rear axle of the vehicle.

16. A vehicle control system according to claim 15, wherein the force detecting means is formed by a bearing sensor in the rear axle.

17. A vehicle control system according to claim 14, comprising means for detecting a vertical position of an implement of the work vehicle.

18. A vehicle control system according to claim 14, comprising means for detecting a load of an implement of the work vehicle.

19. A work vehicle comprising a braking system as claimed in claim 14.

\* \* \* \* \*